(12) United States Patent
Adachi

(10) Patent No.: US 6,798,102 B2
(45) Date of Patent: Sep. 28, 2004

(54) MOTOR HAVING CLUTCH

(75) Inventor: Tadashi Adachi, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 10/359,070

(22) Filed: Feb. 6, 2003

(65) Prior Publication Data

US 2003/0155824 A1 Aug. 21, 2003

(30) Foreign Application Priority Data

Feb. 8, 2002 (JP) .......................... 2002-032458

(51) Int. Cl.[7] .............................................. H02K 7/108
(52) U.S. Cl. .......................................... 310/78; 192/44
(58) Field of Search ................................ 310/75 R, 78; 192/38, 42, 44, 48.2, 415, 55.5, 84.81

(56) References Cited

U.S. PATENT DOCUMENTS

| | | | | |
|---|---|---|---|---|
| 3,662,197 A | * | 5/1972 | Worst ........................... | 310/78 |
| 3,757,472 A | | 9/1973 | Rogakos | |
| 4,510,405 A | * | 4/1985 | Carroll et al. ................. | 310/76 |
| 4,825,988 A | * | 5/1989 | Nishimura ............. | 192/12 BA |
| 4,853,570 A | * | 8/1989 | Isozumi et al. ................ | 310/78 |
| 4,986,400 A | * | 1/1991 | Heller .......................... | 192/26 |
| 5,090,538 A | * | 2/1992 | Osawa ..................... | 192/84.81 |
| 5,631,511 A | * | 5/1997 | Schulmann et al. .......... | 310/83 |
| 5,711,740 A | * | 1/1998 | Bakowski ................... | 475/303 |

FOREIGN PATENT DOCUMENTS

JP     A-2001-289265     10/2001

* cited by examiner

Primary Examiner—Tran Nguyen
(74) Attorney, Agent, or Firm—Posz & Bethards, PLC

(57) ABSTRACT

A clutch is arranged between a rotatable shaft and a worm shaft in a motor. The clutch includes a driving-side rotator connected to the rotatable shaft, a driven-side rotator connected to the worm shaft, a spring support and a coil spring arranged in the spring support. When the driving-side rotator is rotated upon energization of the motor, the coil spring is wound by the driving-side rotator to reduce an outer diameter of the coil spring, so that the rotation of the driving-side rotator is transmitted to the driven-side rotator and the worm shaft. When the driven-side rotator is rotated by an external mechanical force, the coil spring is unwound by the driven-side rotator to increase the outer diameter of the coil spring, so that a frictional force between the spring support and the coil spring is increased to restrain rotation of the driven-side rotator.

15 Claims, 6 Drawing Sheets

MOTOR HAVING CLUTCH

CROSS REFERENCE TO RELATED APPLICATION

This application is based on and incorporates herein by reference Japanese Patent Application No. 2002-32458 filed on Feb. 8, 2002.

BACKGROUND OF THE INVENTION

1. Field of the Invention

The present invention relates to a motor that includes a rotatable shaft, a worm shaft and a clutch, which is arranged between the rotatable shaft and the worm shaft to transmit rotation of the rotatable shaft to the worm shaft and to restrain transmission of rotation from the worm shaft to the rotatable shaft.

2. Description of Related Art

A motor, which includes a motor main body and a speed reducing unit, is used, for example, as a drive source for driving a vehicle power window system installed in a vehicle door. The speed reducing unit reduces a rotational speed of the motor main body and transmits it to an output shaft of the motor. In the motor of the power window system, the weight of a window glass or vibrations of the running vehicle could cause application of rotational force to the output shaft, so that it is necessary to prevent reverse rotation of the output shaft to prevent downward movement of the window glass. To address this, the motor of the power window system is provided with a clutch, which prevents the reverse rotation of the output shaft (or which locks the output shaft).

For example, one previously proposed clutch includes an outer collar, a driving-side rotator, a driven-side rotator, a plurality of balls or cylindrical rollers. The outer collar is non-rotatably arranged. The driving-side rotator is rotated by the motor main body. The driven-side rotator rotates integrally with the output shaft. The balls or cylindrical rollers are arranged between the driven-side rotator and the outer collar. When rotational force is applied from the load side (e.g., from the window glass) to the output shaft, each ball or roller is placed into a wedge-shaped space defined between the driven-side rotator and the outer collar. Thus, rotation of the driven-side rotator is restrained, and the output shaft is locked.

However, the above clutch includes the outer collar, the driving-side rotator, the driven-side rotator and the balls or rollers, so that the number of the components of the clutch is relatively large. Thus, assembly of the clutch is a time consuming task. Furthermore, since the clutch is constructed to lock the output shaft by placing each ball or roller into the wedge-shaped space, the structure of the clutch is complicated, and relatively high precision is required on each component. As a result, productivity of the clutch is relatively low, and thus the manufacturing cost of the clutch is relatively high. This causes an increase in the manufacturing cost of the motor.

Furthermore, smaller and lighter vehicle motors, such as a smaller and lighter motor of the power window system, have been in great demand. Thus, a smaller and lighter clutch installed in such a motor has been also in great demand.

SUMMARY OF THE INVENTION

The present invention addresses the above disadvantages. Thus, it is an objective of the present invention to provide a smaller and lighter motor, which can be produced at a lower manufacturing cost, by reducing the number of components of the motor and simplifying a structure of the motor.

To achieve the objective of the present invention, there is provided a motor that includes a motor main body, a speed reducing unit and a clutch. The motor main body includes a rotatable shaft, which is driven to rotate upon energization of the motor main body. The speed reducing unit is connected to the motor main body and includes a worm shaft and an output shaft. The worm shaft is rotatably supported in coaxial relationship to the rotatable shaft. The speed reducing unit transmits rotation of the worm shaft to the output shaft after reducing a rotational speed of the worm shaft. The clutch is arranged between the rotatable shaft and the worm shaft. The clutch includes a driving-side rotator, a driven-side rotator, a spring support and a coil spring. The driving-side rotator rotates integrally with the rotatable shaft. The driven-side rotator rotates integrally with the worm shaft. The spring support includes an inner peripheral surface and is non-rotatably arranged. The coil spring includes a spring main body, first and second driving-side engaging portions, and first and second driven-side engaging portions. The spring main body is received in the spring support and is helically wound. The spring main body includes first and second ends. The first and second driving-side engaging portions are provided in the first and second ends, respectively, of the spring main body and are engageable with the driving-side rotator in a corresponding rotational direction for winding the spring main body and thus for reducing an outer diameter of the spring main body. The first and second driven-side engaging portions are provided in the first and second ends, respectively, of the spring main body and are engageable with the driven-side rotator in a corresponding rotational direction for unwinding the spring main body and thus for increasing the outer diameter of the spring main body. When the driving-side rotator is rotated by the rotatable shaft upon energization of the motor main body, the spring main body is wound to decrease the outer diameter of the spring main body, so that rotation of the driving-side rotator is transmitted to the driven-side rotator through the coil spring. When the driven-side rotator is rotated by an external mechanical rotational force generated outside the motor, the spring main body is unwound to increase the outer diameter of the spring main body, so that a frictional force between an outer peripheral surface of the spring main body and the inner peripheral surface of the spring support is increased to lock the output shaft.

To achieve the objective of the present invention, there is also provided a motor that includes a first shaft, a second shaft and a clutch. The first shaft is driven to rotate upon energization of the motor. The second shaft is rotatably supported in coaxial relationship to the first shaft. The clutch is arranged between the first shaft and the second shaft such that the clutch transmits rotation from the first shaft to the second shaft and restrains transmission of rotation from the second shaft to the first shaft. The clutch includes a driving-side rotator, a driven-side rotator, a spring support and a coil spring. The driving-side rotator is connected to the first shaft to rotate integrally with the first shaft. The driven-side rotator is connected to the second shaft to rotate integrally with the second shaft. The spring support includes a cylindrical wall, which is arranged radially outward of the driving-side rotator and the driven-side rotator and is stationary. The coil spring is axially placed between the driving-side rotator and the driven-side rotator. The coil spring includes a spring main body, at least one driving-side engaging portion and at least one driven-side engaging portion. The spring main body is helically wound and is received inside the cylindrical wall of the spring support in such a manner that the spring main body is resiliently urged against the cylindrical wall when the first shaft and the second shaft are both stopped. The at least one driving-side engaging portion is connected to the spring main body and projects beyond the spring main body in a first axial direction. The at least one driving-side engaging portion is engageable with the driving-side rotator. The at least one driven-side engaging portion is connected to the spring main body and project beyond the spring main body in a second axial direction opposite to the first axial direction. The at least one driven-side engaging portion is engageable with the driven-side rotator. When the driving-side rotator is rotated through energization of the motor, the driving-side rotator engages and moves one of the at least one driving-side engaging portion of the coil spring to wind the spring main body, so that the spring main body is released from the cylindrical wall to rotate integrally with the driving-side rotator, and thus rotation of the driving-side rotator transmitted to the spring main body is further transmitted to the driven-side rotator through one of the at least one driven-side engaging portion of the coil spring to rotate the driven-side rotator and the second shaft. When the driven-side rotator is rotated by an external mechanical rotational force generated outside the motor, the driven-side rotator engages and moves one of the at least one driven-side engaging portion of the coil spring to unwind the spring main body, so that the spring main body is further urged against the cylindrical wall of the spring support to restrain further rotation of the driven-side rotator.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

One embodiment of the present invention will be described with reference to the accompanying drawings.

Figure 1:
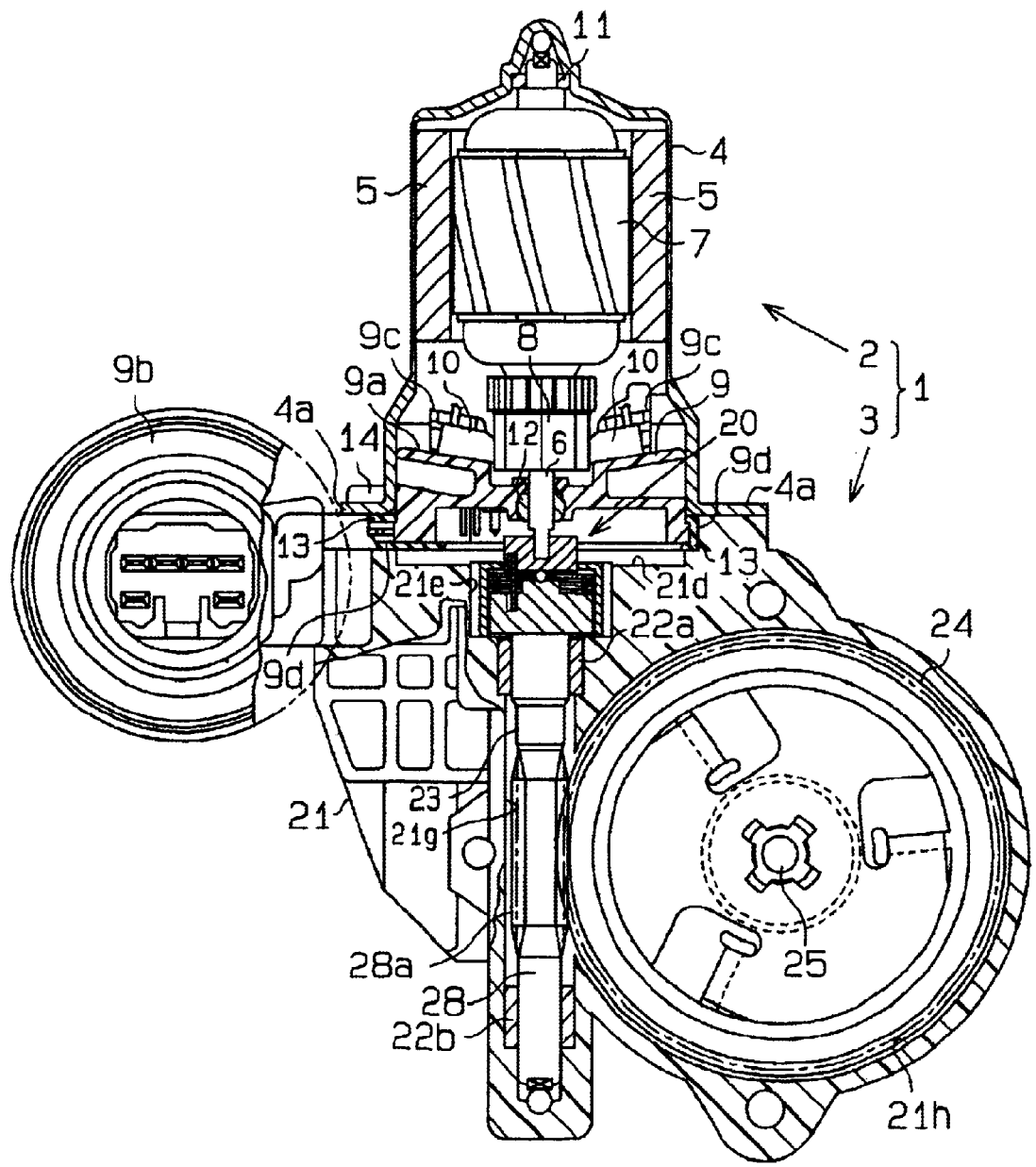
FIG. 1 is a cross sectional view of a motor according to an embodiment of the present invention.

FIG. 1 is a schematic cross sectional view of a motor 1 of the present embodiment used as a drive source for driving a vehicle power window system installed in a vehicle door. The motor 1 includes a motor main body 2, a speed reducing unit 3 and a clutch 20.

The motor main body 2 includes a yoke housing 4, a pair of magnets 5, a rotatable shaft (first shaft) 6, an armature 7, a commutator 8, a brush holder 9 and power supply brushes 10.

Figure 2:
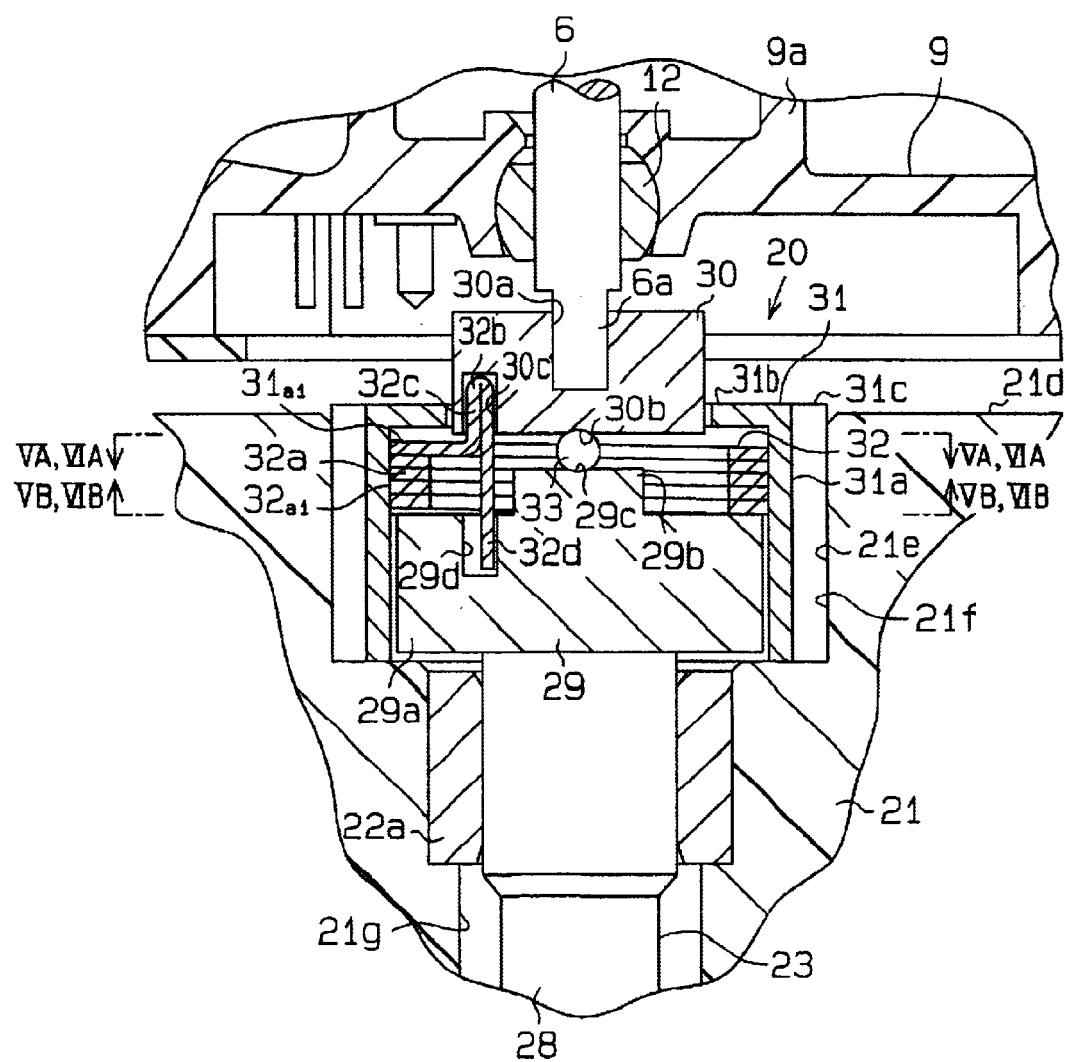
FIG. 2 is an enlarged partial cross sectional view of FIG. 1 showing a clutch of the motor.
Figure 3:
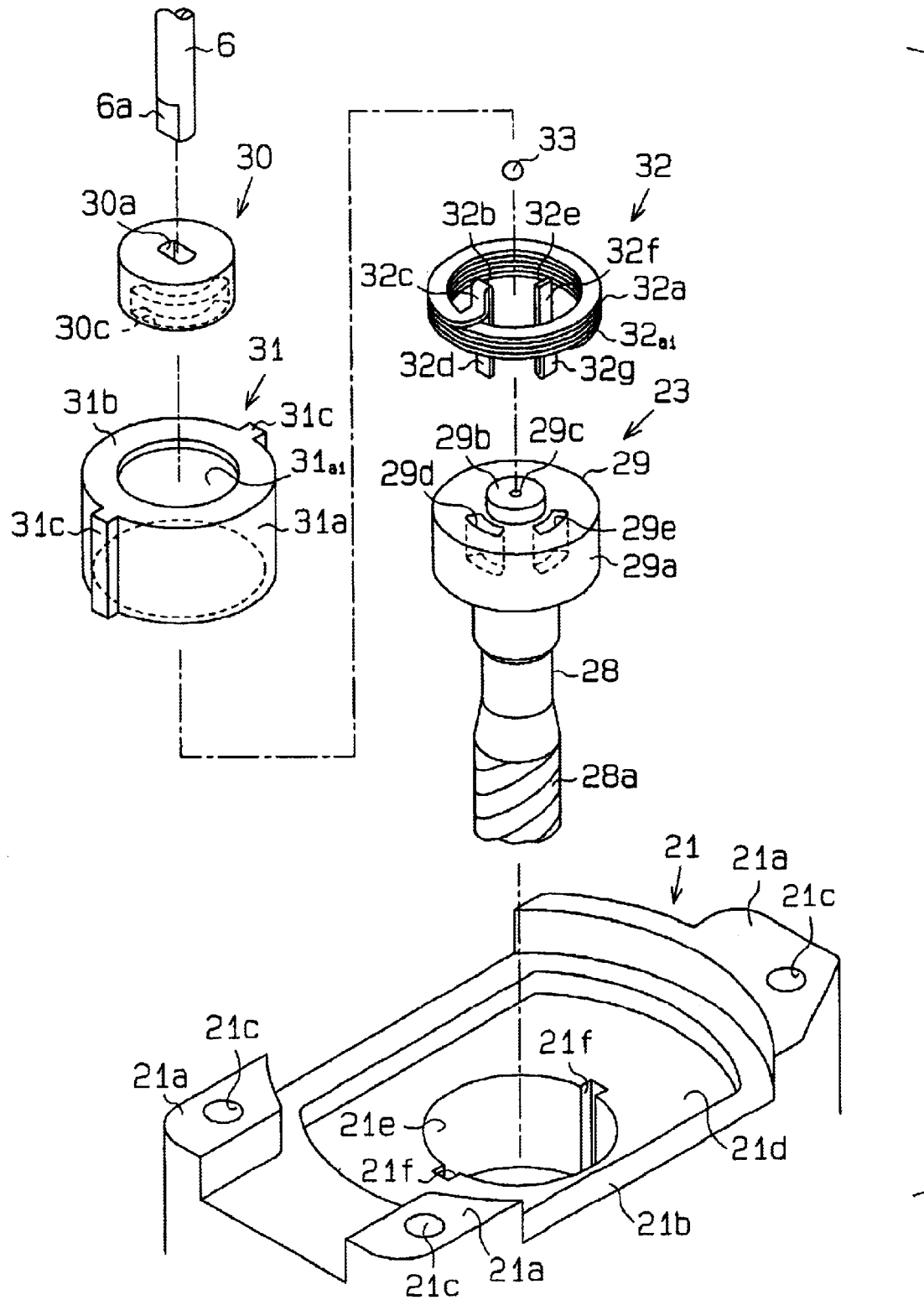
FIG. 3 is an exploded perspective view showing the clutch.

The yoke housing 4 is generally shaped as a cup having a low prifile. The magnets 5 are secured to an inner peripheral surface of the yoke housing 4 in opposed relationship to each other. The armature 7 is received inward of the magnets 5. The armature 7 includes the rotatable shaft 6. A base end of the rotatable shaft 6 is rotatably supported by a bearing 11 arranged at the center of the base of the yoke housing 4. The commutator 8 is secured to a predetermined position at a distal end side of the rotatable shaft 6. As shown in FIGS. 2 and 3, a connecting portion 6a, which has diametrically opposing flat outer wall surfaces, is formed at the distal end of the rotatable shaft 6.

The brush holder 9 is fitted in an open end of the yoke housing 4. The brush holder 9 includes a holder main body 9a and a connector 9b. The holder main body 9a is configured to substantially cover the opening of the open end of the yoke housing 4. The connector 9b is formed integrally with the holder main body 9a and radially outwardly protrudes from the yoke housing 4.

A bearing 12 is arranged at the center of the holder main body 9a to rotatably support an intermediate portion of the rotatable shaft 6 located between the commutator 8 and the connecting portion 6a. The power supply brushes 10, which are in sliding contact with the commutator 8, are supported by brush holding portions 9c, respectively, at the yoke housing 4 side of the holder main body 9a. The power supply brushes 10 are connected to the connector 9b through a wiring (not shown). The connector 9b receives electric power from a vehicle side. Then, the electric power is supplied to the armature 7 through the power supply brushes 10 and the commutator 8, so that the armature 7 (rotatable shaft 6) is rotated, i.e., the motor main body 2 is driven to rotate.

A clamping portion 9d, which is clamped between the open end of the yoke housing 4 and an open end of a gear housing 21 (described later), is formed around an entire periphery of the holder main body 9a. The clamping portion 9d is covered with a seal member 13. The seal member 13 is clamped between the open end of the yoke housing 4 and the open end of the gear housing 21 to seal between the open end of the yoke housing 4 and the open end of the gear housing 21.

Flange portions 4a are formed at the open end of the yoke housing 4 to secure the yoke housing 4 (motor main body 2) to the gear housing 21. The flange portions 4a have screw receiving through holes (not shown) for receiving three screws 14 (only one is shown in FIG. 1) at predetermined positions.

The speed reducing unit 3 includes the gear housing 21, bearings 22a, 22b, a worm shaft (second shaft) 23, a worm wheel 24 and an output shaft 25.

The gear housing 21 is made of a resin material. Furthermore, with reference to FIG. 3, the open end of the gear housing 21 includes securing portions 21a, to which the motor main body 2 is secured, and a fitting portion 21b, to which the clamping portion 9d of the brush holder 9 is fitted. Three screw receiving holes 21c are formed in the securing portions 21a to receive the corresponding screws 14. Each screw receiving hole 21c extends to a corresponding nut installing portion, in which a nut (not shown) is installed. After the gear housing 21 is fitted to the yoke housing 4 such that the brush holder 9 is clamped between the gear housing 21 and the yoke housing 4, the gear housing 21 and the yoke housing 4 are secured to each other by threadably engaging the screws 14 with the corresponding nuts.

A recess 21d is arranged inward of the fitting portion 21b. A receiving recess 21e, which has a generally circular cross section, is formed at the center of the bottom of the recess 21d. Two rotation preventing grooves 21f are formed in the receiving recess 21e such that the rotation preventing grooves 21f linearly extend in the axial direction. As shown in FIG. 1, a worm shaft receiving portion 21g, which extends in the axial direction of the rotatable shaft 6, is formed in the middle of the receiving recess 21e. Two bearings 22a, 22b are fitted in the worm shaft receiving portion 21g at predetermined positions. The worm shaft receiving portion 21g is communicated with a wheel receiving portion 21h.

With reference to FIGS. 2 and 3, the worm shaft 23 includes a worm shaft main body 28 and a driven-side rotator 29. The driven-side rotator 29 is integrally formed in a base end side (i.e., a motor main body 2 side) of the worm shaft main body 28. A worm 28a is formed in a middle section of the worm shaft main body 28. The worm shaft 23 is rotatably supported by the bearings 22a, 22b and is received in the worm shaft receiving portion 21g in coaxial relationship to the rotatable shaft 6.

The worm wheel 24 is meshed with the worm shaft 23 (worm 28a) and is received in the wheel receiving portion 21h such that the rotational axis of the worm wheel 24 is generally perpendicular to the worm shaft 23. The output shaft 25 is connected to the worm wheel 24 to integrally rotate with the worm wheel 24. The output shaft 25 is drivingly coupled to a known window regulator (not shown), which raises and lowers a corresponding window glass.

The clutch 20 is arranged between the rotatable shaft 6 and the worm shaft 23 to drivingly couple therebetween. The clutch 20 transmits rotational force of the rotatable shaft 6, which is rotated upon energization of the motor main body 2, to the load side (i.e., the window regulator) through the worm shaft 23. However, when an external mechanical rotational force is applied to the output shaft 25 from the load side, the clutch 20 restrains rotation of the worm shaft 23 to restrain the reverse rotation of the output shaft 25 (i.e., to lock the output shaft 25).

Figure 4:
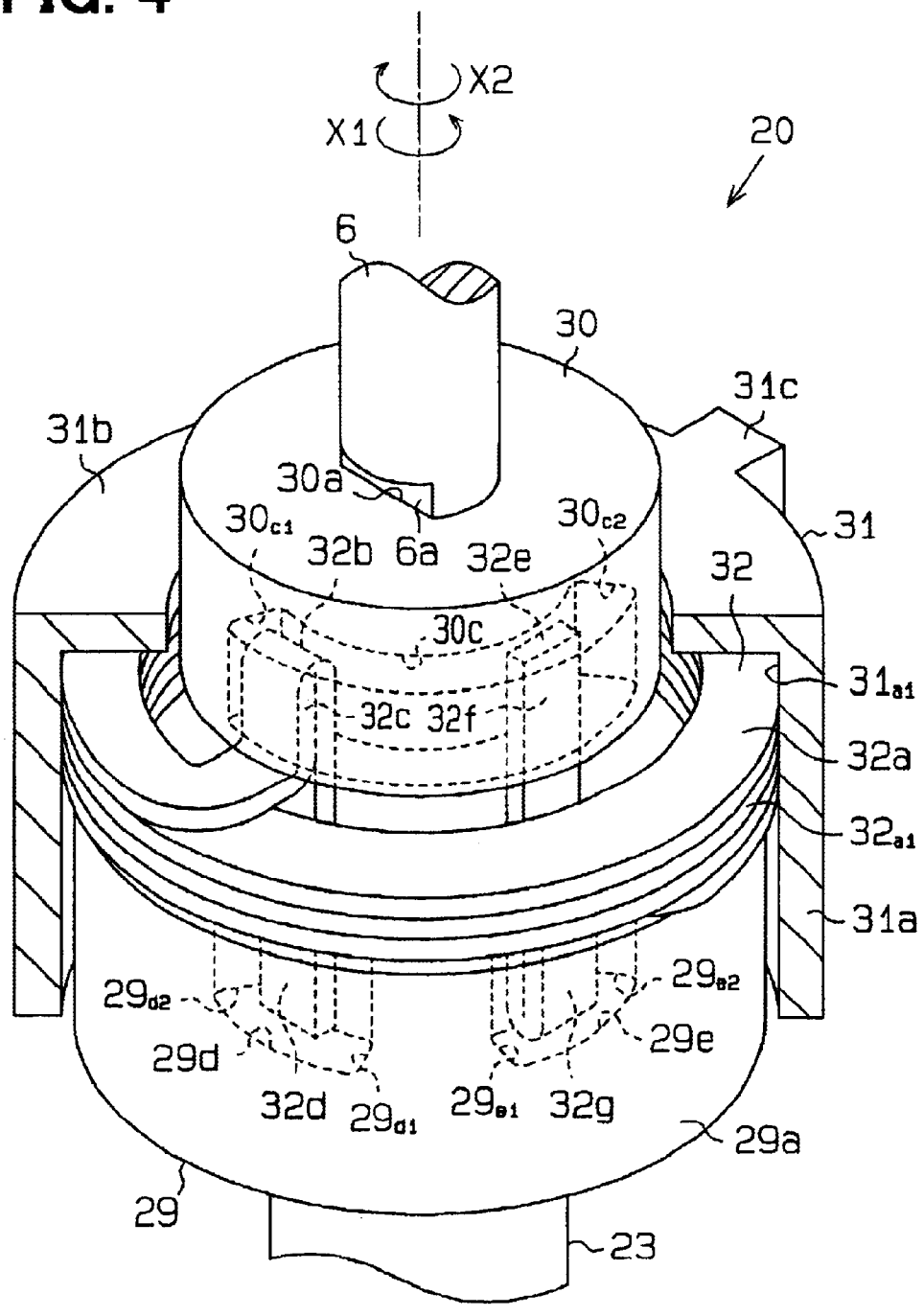
FIG. 4 is an enlarged perspective view of the clutch.

With reference to FIGS. 2–4, the clutch 20 includes the driven-side rotator 29 integrated in the worm shaft 23, the driving-side rotator 30, a spring support 31, a coil spring 32 and a ball 33.

Figure 5A:
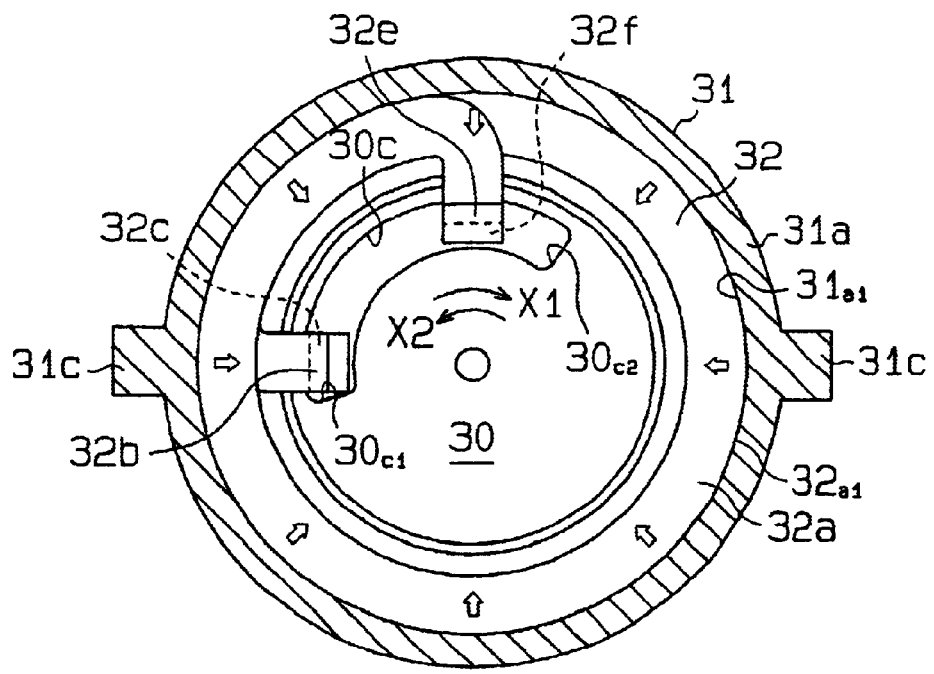
FIG. 5A is a cross sectional view along line VA—VA in FIG. 2 showing one operational state of the clutch.
Figure 5B:
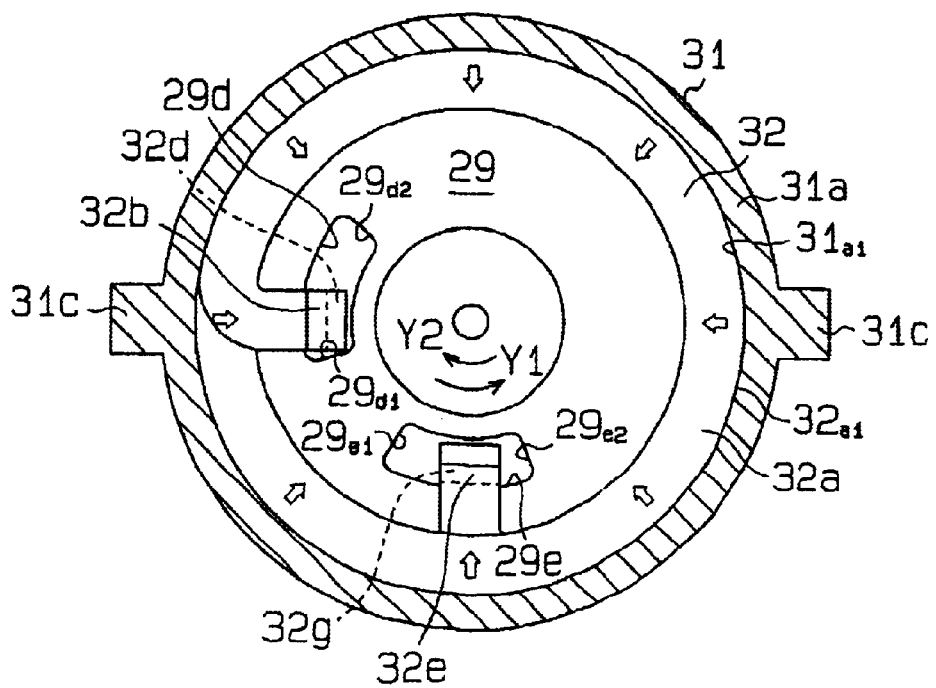
FIG. 5B is a cross sectional view along line VB—VB in FIG. 2 showing the one operational state of the clutch.

The driven-side rotator 29 includes a cylindrical rotator main body 29a and a cylindrical protrusion 29b that protrudes from the center of the rotator main body 29a in the axial direction. An engaging portion 29c is recessed in the center of the protrusion 29b to engage with the ball 33. Two arcuate engaging grooves 29d, 29e are formed in an end surface of the rotator main body 29a at a location that is radially offset from the center of the rotator main body 29a. Each engaging groove 29d, 29e circumferentially extends a predetermined length in the rotator main body 29a. A corresponding one of first and second driven-side projections (first and second driven-side engaging portions) 32d, 32g of the coil spring 32 described below is circumferentially movably received in each engaging groove 29d, 29e. A circumferential length of the engaging groove 29d between one circumferential end 29d1 and the other circumferential end 29d2 of the engaging groove 29d and a circumferential length of the engaging groove 29e between one circumferential end 29e1 and the other circumferential end 29e2 of the engaging groove 29e are selected as follows. That is, as shown in FIG. 5B, when the first driven-side projection 32d engages the one end 29d1 of the engaging groove 29d, the second driven-side projection 32g is placed in the circumferential center of the engaging groove 29e.

Similarly, when the second driven-side projection 32g engages the one end 29e1 of the engaging groove 29e, the first driven-side projection 32d is placed in the circumferential center of the engaging groove 29d.

The driving-side rotator 30 is shaped as a cylindrical body. A connecting hole 30a, to which the connecting portion 6a of the rotatable shaft 6 is fitted, is formed in one end (i.e., end surface) of the driving-side rotator 30. When the connecting portion 6a of the rotatable shaft 6 is fitted to the connecting hole 30a, the rotatable shaft 6 is connected to the driving-side rotator 30 to rotate integrally with the driving-side rotator 30. An engaging portion 30b, which is engaged with the ball 33, is formed in the other end (i.e., end surface) of the driving-side rotator 30. That is, the driving-side rotator 30 and the driven-side rotator 29 are axially immovably arranged while the ball 33 is placed between the driving-side rotator 30 and the driven-side rotator 29. In this embodiment, an axial extent of the driving-side rotator 30 is separated from an axial extent of the driven-side rotator 29 by the ball 33. Alternatively, it is possible to at least partially overlap the axial extent of the driving-side rotator 30 with the axial extent of the driven-side rotator 29. Furthermore, an arcuate engaging groove 30c is formed in the other end (i.e., end surface) of the driving-side rotator 30 to extend circumferentially at a location that is radially offset from the center of the driving-side rotator 30. First and second driving-side projections (first and second driving-side engaging portions) 32c, 32f (described later) of the coil spring 32 are circumferentially movably received in the engaging groove 30c. As shown in FIG. 5A, a circumferential length of the engaging groove 30c between one circumferential end 30c1 and the other circumferential end 30c2 of the engaging groove 30c is selected to allow circumferential movement of the projections 32c, 32f.

The spring support 31 includes a cylindrical portion (cylindrical wall) 31a, a closing portion 31b and two rotation preventing projections 31c. The closing portion 31b extends radially inward from one end of the cylindrical portion 31a. The rotation preventing projections 31c project radially outwardly from an outer peripheral surface of the cylindrical portion 31a and are received in the rotation preventing grooves 21f, respectively. The spring support 31 receives the driven-side rotator 29, the coil spring 32 and the ball 33. The spring support 31 is inserted or press fitted into the receiving recess 21e, and the rotation preventing projections 31c are inserted into the rotation preventing grooves 21f, respectively. Thus, the spring support 31 is non-rotatably installed to the gear housing 21.

The coil spring 32 is arranged between the driving-side rotator 30 and the driven-side rotator 29. A spring main body 32a of the coil spring 32 is formed by helically winding a narrow flat strip plate material such that corresponding adjacent axial segments of the spring main body 32a contact with each other. One end (first end) of the spring main body 32a is bent to form a first projection 32b, which projects in both axial directions (first and second axial directions). A portion of the first projection 32b, which projects toward the driving-side rotator 30 in the first axial direction, is referred to as the first driving-side projection 32c, and a portion of the first projection 32b, which projects toward the driven-side rotator 29 in the second axial direction, is referred to as the first driven-side projection 32d. The other end (second end) of the spring main body 32a is bent to form a second projection 32e, which projects in both axial directions. A portion of the second projection 32e, which projects toward the driving-side rotator 30 in the first axial direction, is referred to as the second driving-side projection 32f, and a portion of the second projection 32e, which projects toward the driven-side rotator 29 in the second axial direction, is referred to as the second driven-side projection 32g.

Figure 6A:
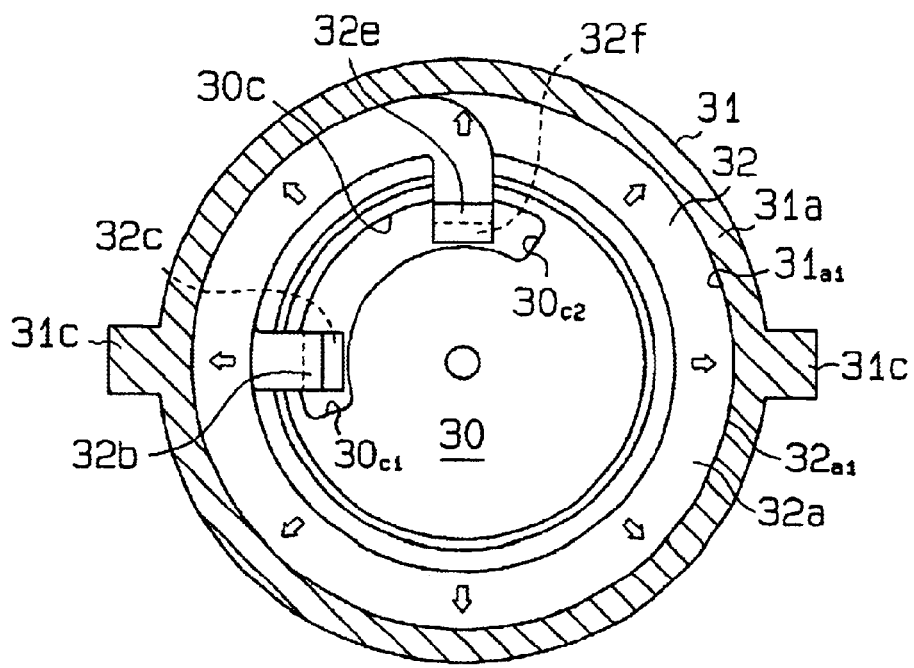
FIG. 6A is a cross sectional view along line VIA—VIA in FIG. 2 showing another operational state of the clutch.

The first and second driving-side projections 32c, 32f are received in the engaging groove 30c of the driving-side rotator 30. Each of the first and second driving-side projection 32c, 32f is movable within the engaging groove 30c. The first and second driven-side projections 32d, 32g are received in the engaging grooves 29d, 29e, respectively, of the driven-side rotator 29. Each of the first and second driven-side projections 32d, 32g is movable within the corresponding groove 29d, 29e. When the first projection 32b and the second projection 32e are moved toward each other, the spring main body 32a is wound to reduce an outer diameter of the spring main body 32a (as indicated by blanked arrows in FIGS. 5A and 5B). When the first projection 32b and the second projection 32e are moved away from each other, the spring main body 32a is unwound to increase the outer diameter of the spring main body 32a (as indicated by blanked arrows in FIGS. 6A and 6B).

The coil spring 32 is formed such that an outer diameter of the spring main body 32a is larger than an inner diameter of the spring support 31 (cylindrical portion 31a) by a predetermined amount in a relaxed state of the coil spring 32. The spring main body 32a is received in the spring support 31 while the spring main body 32a is wound to decrease the outer diameter of the spring main body 32a by a predetermined amount. Because of the resilient returning force of the coil spring 32 (spring main body 32a), the outer peripheral surface 32a1 of the spring main body 32a is urged against an inner peripheral surface 31a1 of the spring support 31 (cylindrical portion 31a), so that a predetermined frictional force is generated between the coil spring 32 and the spring support 31. That is, the coil spring 32 is installed in the spring support 31 while the rotation of the coil spring 32 is restrained within the spring support 31.

In the clutch 20, when the driving-side rotator 30 is rotated together with the rotatable shaft 6, for example, in a direction of an arrow X1 (first rotational direction) in FIG. 5A, the one end 30c1 of the engaging groove 30c of the driving-side rotator 30 and the first driving-side projection 32c of the coil spring 32 are engaged with each other in the rotational direction, so that the rotational force is applied to the spring 32 in the rotational direction. At that time, rotation of the coil spring 32 is restrained by the frictional force generated between the coil spring 32 and the spring support 31, so that the first driving-side projection 32c (first projection 32b) and the second driving-side projection 32f (second projection 32e) come close to each other. Thus, the coil spring 32 (spring main body 32a) is wound to decrease the outer diameter of the coil spring 32 (spring main body 32a), as indicated by the blanked arrows in FIGS. 5A and 5B, so that the frictional force between the coil spring 32 and the spring support 31 is gradually reduced. When the rotational force applied to the coil spring 32 overcomes this frictional force, the coil spring 32 rotates in the same direction (direction of the arrow X1), and the first driven-side projection 32d of the coil spring 32 and the one end 29d1 of the engaging groove 29d of the driven-side rotator 29 are engaged with each other in the rotational direction, as shown in FIG. 5B. As a result, the driven-side rotator 29 is rotated together with the coil spring 32 in the rotational direction of the driving-side rotator 30, i.e., the direction of Y1, so that the worm shaft 23 is rotated in the same direction.

when the driving-side rotator 30 is rotated together with the rotatable shaft 6 in a direction of an arrow X2 (second rotational direction) in FIG. 5A, the other end 30c2 of the engaging groove 30c of the driving-side rotator 30 and the second driving-side projection 32f of the coil spring 32 are engaged with each other in the rotational direction, so that the rotational force is applied to the coil spring 32 in the same direction. At this time, similar to the above event, rotation of the coil spring 32 is restrained by the frictional force generated between the coil spring 32 and the spring support 31, so that the second driving-side projection 32f (second projection 32e) and the first driving-side projection 32c (first projection 32b) come closer. Thus, the coil spring 32 (spring main body 32a) is wound to reduce the outer diameter of the coil spring 32 (spring main body 32a), so that the coil spring 32 is rotated in the same direction (direction of the arrow X2), and the second driven-side projection 32g of the coil spring 32 and the one end 29e1 of the engaging groove 29e of the driven-side rotator 29 are engaged with each other in the rotational direction. As a result, the driven-side rotator 29 is rotated together with the coil spring 32 in the rotational direction of the driving-side rotator 30, i.e., in the direction of the arrow Y2, and the worm shaft 23 is rotated in the same direction.

When the rotation is transmitted from the rotatable shaft 6 (driving-side rotator 35) to the worm shaft 23 (driven-side rotator 29) through the clutch 20, the worm wheel 24 and the output shaft 25 are rotated according to this rotation. Then, the window regulator is operated based on the rotation of the output shaft 25 to open or close (i.e., to raise or lower) the window glass.

On the other hand, in the state where the motor 1 is stopped, when rotational force is applied to the output shaft 25 from the load side (window glass side), the worm shaft 23, i.e., the driven-side rotator 29 tends to rotate. In such a case, when the driven-side rotator 29 tries to rotate, for example, in the direction of the arrow Y2 in FIG. 6B, the one end 29d1 of the engaging groove 29d of the driven-side rotator 29 and the first driven-side projection 32d of the coil spring 32 are engaged with each other in the rotational direction, and the rotational force is applied to the coil spring 32 in the same rotational direction. At that time, rotation of the coil spring 32 is restrained by the frictional force between the coil spring 32 and the spring support 31, so that the first driven-side projection 32d (first projection 32b) and the second driven-side projection 32g (second projection 32e) are spaced further away from each other. Thus, the coil spring 32 (spring main body 32a) is unwound to increase the outer diameter of the coil spring 32 (spring main body 32a), as indicated by the blanked arrows in FIGS. 6A and 6B, so that the frictional force between the coil spring 32 and the spring support 31 is gradually increased. As a result, the rotation of the coil spring 32 is effectively restrained, and rotation of the driven-side rotator 29, i.e., the worm shaft 23 is prevented.

Figure 6B:
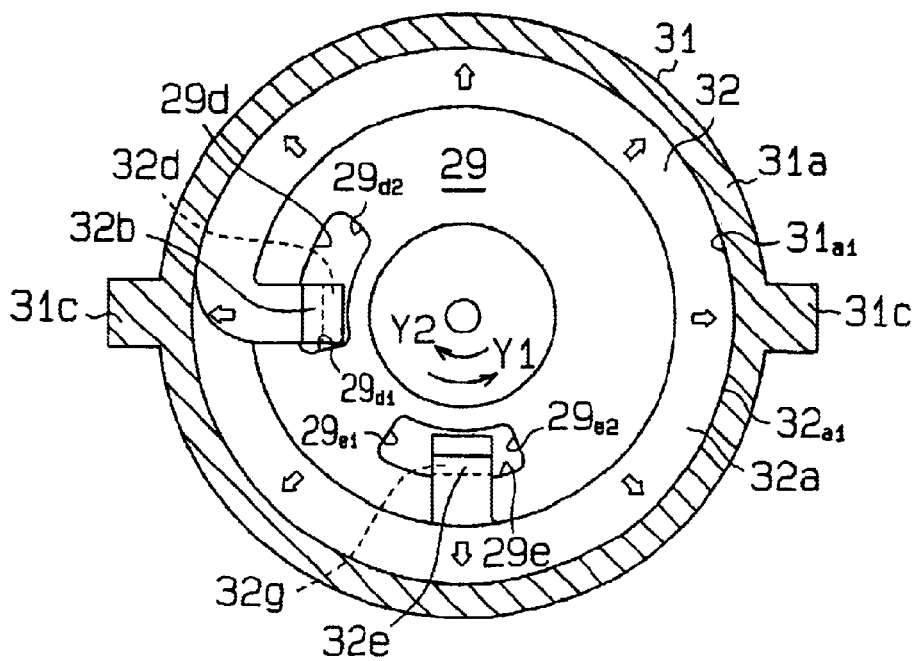
FIG. 6B is a cross sectional view along line VIB—VIB in FIG. 2 showing the operational state of FIG. 6A.

Furthermore, when the driven-side rotator 29 is rotated in the direction of the arrow Y1 in FIG. 6B, the one end 29e1 of the engaging groove 29e of the driven-side rotator 29 and the second driven-side projection 32g of the coil spring 32 are engaged with each other in the rotational direction, so that the rotational force is applied to the coil spring 32 in the same rotational direction. At this time, as discussed above, the rotation of the coil spring 32 is restrained by the frictional force generated between the coil spring 32 and the spring support 31, so that the second driven-side projection 32g (second projection 32e) and the first driven-side projection 32d (first projection 32b) are spaced further away from each other. Then, since the coil spring 32 (spring main body 32a) is unwound to increase the outer diameter of the coil spring 32 (spring main body 32a), the frictional force between the coil spring 32 and the spring support 31 is gradually increased. Thus, the rotation of the coil spring 32 is effectively restrained, and the rotation of the driven-side rotator 29, i.e., the rotation of the worm shaft 23 is prevented.

In this way, even when the downward load, which is induced, for example, by the weight of the window glass or vibrations of the running vehicle, is applied to the window glass to rotate the output shaft 25, the rotation of the worm shaft 23 is prevented by the clutch 20, and the output shaft 25 is locked to prevent downward movement of the window glass.

The motor 1 of the present embodiment provides the following advantages.

(1) The clutch 20 of the motor 1 according to the present embodiment includes only the driving-side rotator 30, the driven-side rotator 29, the spring support 31 and the coil spring 32, so that the number of the components is reduced in comparison to the previously proposed clutches, and the assembly is eased.

Furthermore, the clutch 20 is constructed such that when the driven-side rotator 29 tries to rotate, the coil spring 32 is unwound to increase the outer diameter of the coil spring 32, so that the frictional force between the outer peripheral surface 32a1 of the spring main body 32a and the inner peripheral surface 31a1 of the spring support 31 is increased to lock the output shaft 25. Thus, the structure is simplified, and high precision is not required for each component. As a result, manufacturability of the clutch 20 can be improved, and thus the cost of the clutch 20 and of the motor 1 can be reduced.

Also, the one end and the other end of the spring main body 32a respectively include the first driving-side projection 32c and the second driving-side projection 32f, each of which engages with the driving-side rotator 30 in the corresponding rotational direction that causes radially inward compression of the spring main body 32a. The one end and the other end of the spring main body 32a also respectively include the first driven-side projection 32d and the second driven-side projection 32g, each of which engages with the driven-side rotator 29 in the corresponding rotational direction that causes radially outward expansion of the spring main body 32a. In this way, when the driving-side rotator 30 is rotated in any rotational direction, the spring main body 32a is wound to allow transmission of the rotation to the driven-side rotator 29. Furthermore, when the driven-side rotator 29 is rotated in any rotational direction, the spring main body 32a is unwound to increase the outer diameter of the spring main body 32a, so that the frictional force between the outer peripheral surface 32a1 of the spring main body 32a and the inner peripheral surface 31a1 of the spring support 31 is increased to lock the output shaft 25. That is, the operational direction of the clutch is not limited to any particular rotational direction, so that the installation direction of the motor 1 relative to the vehicle is not limited to any one, and thus the motor 1 can be used in various applications.

Furthermore, the clutch 20 of the present embodiment is placed in the position between the rotatable shaft 6 and the worm shaft 23 where the amount of torque is relatively small in the drive force transmitting path within the motor 1. Thus, the strength of each component of the clutch 20 can be reduced. As a result, the size and the weight of the clutch 20 and of the motor 1 can be advantageously reduced.

(2) The coil spring 32 is formed by helically winding the flat strip plate material such that corresponding adjacent axial segments of the spring main body 32a contact with each other. This allows a reduction in the axial size of the coil spring 32. Thus, the axial size of the clutch 20 and the axial size of the motor 1 can be advantageously reduced.

(3) The engaging groove 30c is provided in the driving-side rotator 30 to receive the driving-side projections 32c, 32f, and the engaging grooves 29d, 29e are provided in the driven-side rotator 29 to receive the driven-side projections 32d, 32g. Thus, a size of the connection between each projection 32c, 32d, 32f, 32g and the corresponding rotator 30, 29 can be reduced in the axial direction. As a result, the axial size of the clutch 20 and the axial size of the motor 1 can be advantageously reduced.

(4) The coil spring 32 is received in the spring support 31 while the coil spring 32 is wound to decrease the outer diameter of the coil spring 32 by the predetermined amount, so that the frictional force is initially provided between the spring 32 and the spring support 31. Thus, when the rotational force is applied to the driven-side rotator 29, the rotation of the driven-side rotator 29 can be restrained within a shorter time period. As a result, the output shaft 25 can be advantageously locked within the shorter time period. Furthermore, staggering of the coil spring 32 in the spring support 31 can be advantageously prevented.

The above embodiment can be modified as follows.

In the above embodiment, the driving-side rotator 30 is detachably assembled to the rotatable shaft 6, and the driven-side rotator 29 is integrally formed with the worm shaft 23. Alternatively, the driving-side rotator 30 can be formed integrally with the rotatable shaft 6. Furthermore, the driven-side rotator 29 can be assembled to the worm shaft 23.

In the above embodiment, the engaging groove 30c for engaging with the projections 32c, 32f is provided in the driving-side rotator 30, and the engaging grooves 29d, 29e for engaging with the projections 32d, 32g, respectively, are provided in the driven-side rotator 29. The shapes of these engaging grooves 30c, 29d, 29e can be modified in any appropriate manner. Furthermore, the engaging grooves 30c, 29d, 29e can be replaced with any other structures to engage with the corresponding projections 32c, 32d, 32f, 32g. For example, the grooves can be replaced with corresponding protrusions. In such a case, the projections 32c, 32d, 32f, 32g are not required to project in the axial direction. For example, the projections 32c, 32d, 32f, 32g can be projected radially inwardly. Further alternatively, each projection 32c, 32d, 32f, 32g can be replaced with a hole, in which the corresponding protrusion is inserted.

The shape of the coil spring 32 can be modified to any suitable shape. For example, the coil spring 32 (spring main body 32a) is formed by helically winding the flat strip plate material such that corresponding adjacent axial segments of the spring main body 32a contact with each other without providing a substantial axial space between corresponding adjacent axial segments of the spring main body 32a. Alternatively, the coil spring 32 can be formed by helically winding the flat strip plate material while providing a substantial axial space between the corresponding adjacent axial segments of the spring main body 32a. Furthermore, in place of the flat strip plate material, the coil spring can be made of a wire material. In the case of coil spring made of the wire material, the shaping of the coil spring becomes easier in comparison to the case of the coil spring made of the flat strip plate material.

In the above embodiment, the coil spring 32 is received in the spring support 31 while the coil spring 32 is wound to reduce the outer diameter of the coil spring 32 by the predetermined amount. Alternatively, such radial compression of the coil spring 32 may be eliminated if the clutch 20 can perform the above described operations.

In the above embodiment, the first driving-side projection 32c and the second driving-side projection 32f are respectively provided in the one end and the other end of the spring main body 32a, and the first driven-side projection 32d and the second driven-side projection 32g are respectively provided in the one end and the other end of the spring main body 32a, so that the rotational direction of the driving-side rotator 30 and of the driven-side rotator 29 are not limited to any particular one rotational direction. Alternatively, only the first driving-side projection 32c and the second driven-side projection 32g may be provided without providing the second driving-side projection 32f and the first driven-side projection 32d to construct the clutch 20 as a clutch that rotates only in one direction. Alternatively, only the second driving-side projection 32f and the first driven-side projection 32d may be provided without providing the first driving-side projection 32c and the second driven-side projection 32g.

The shape of the spring support 31 of the above embodiment can be modified to any other suitable shape. It is only required to have the inner peripheral surface 31a1 in the spring support 31. Furthermore, the spring support 31 can be integrally formed in the gear housing 21. Also, the spring support 31 can be non-rotatably arranged in the brush holder 9.

The arrangement of the clutch 20 of the above embodiment can be modified in any other appropriate manner besides the above described ones. For example, a means for holding the ball 33 can be formed in the driving-side rotator 30 and/or in the driven-side rotator 29.

The arrangement of the motor 1 of the above embodiment can be modified in any other appropriate manner besides the above described ones.

The motor 1 of the above embodiment can be applied to vehicular devices other than the power window system or can be applied to any other devices other than those of the vehicle.

Additional advantages and modifications will readily occur to those skilled in the art. The invention in its broader terms is therefore, not limited to the specific details, representative apparatus, and illustrative examples shown and described.

What is claimed is:

1. A motor comprising:
   a motor main body that includes a rotatable shaft, which is driven to rotate upon energization of the motor main body;
   a speed reducing unit that is connected to the motor main body and includes a worm shaft and an output shaft, wherein the worm shaft is rotatably supported in coaxial relationship to the rotatable shaft, and the speed reducing unit transmits rotation of the worm shaft to the output shaft after reducing a rotational speed of the worm shaft; and
   a clutch that is arranged between the rotatable shaft and the worm shaft, wherein the clutch includes:
      a driving-side rotator that rotates integrally with the rotatable shaft;
      a driven-side rotator that rotates integrally with the worm shaft;
      a spring support that includes an inner peripheral surface and is non-rotatably arranged; and
      a coil spring that includes:
         a spring main body that is received in the spring support and is helically wound, wherein the spring main body includes first and second ends;
         first and second driving-side engaging portions that are provided in the first and second ends, respectively, of the spring main body and are engageable with the driving-side rotator in a corresponding rotational direction for winding the spring main body and thus for reducing an outer diameter of the spring main body; and
         first and second driven-side engaging portions that are provided in the first and second ends, respectively, of the spring main body and are engageable with the driven-side rotator in a corresponding rotational direction for unwinding the spring main body and thus for increasing the outer diameter of the spring main body, wherein:
            when the driving-side rotator is rotated by the rotatable shaft upon energization of the motor main body, the spring main body is wound to decrease the outer diameter of the spring main body, so that rotation of the driving-side rotator is transmitted to the driven-side rotator through the coil spring; and
            when the driven-side rotator is rotated by an external mechanical rotational force generated outside the motor, the spring main body is unwound to increase the outer diameter of the spring main body, so that a frictional force between an outer peripheral surface of the spring main body and the inner peripheral surface of the spring support is increased to lock the output shaft.

2. A motor according to claim 1, wherein the coil spring is formed by helically winding a flat strip plate material.

3. A motor according to claim 1, wherein:
   the driving-side rotator includes at least one engaging groove for receiving the first and second driving-side engaging portions; and
   the driven-side rotator includes at least one engaging groove for receiving the first and second driven-side engaging portions.

4. A motor according to claim 1, wherein the coil spring is received in the spring support while the coil spring is wound to reduce the outer diameter of the spring main body by a predetermined amount.

5. A motor according to claim 1, wherein the clutch further includes a ball, which is arranged between the driving-side rotator and the driven-side rotator, wherein the driving-side rotator and the driven-side rotator are axially immovably arranged through the ball.

6. A motor according to claim 1, wherein each of the first and second driving-side engaging portions and the first and second driven-side engaging portions projects from the spring main body in a corresponding axial direction of the rotatable shaft.

7. A motor according to claim 1, wherein:
   the first driven-side engaging portion is formed integrally with the first driving-side engaging portion by bending an axial end portion of the first driving-side engaging portion; and
   the second driving-side engaging portion is formed integrally with the second driven-side engaging portion by bending an axial end portion of the second driven-side engaging portion.

8. A motor according to claim 1, wherein:
   the first and second driving-side engaging portions project beyond the spring main body in a first axial direction; and the first and second driven-side engaging portions project beyond the spring main body in a second axial direction opposite to the first axial direction.

9. A motor according to claim 1, wherein an axial extent of the driving-side rotator is separated from an axial extent of the driven-side rotator.

10. A motor comprising:

a first shaft that is driven to rotate upon energization of the motor;

a second shaft that is rotatably supported in coaxial relationship to the first shaft; and a clutch that is arranged between the first shaft and the second shaft such that the clutch transmits rotation from the first shaft to the second shaft and restrains transmission of rotation from the second shaft to the first shaft, wherein the clutch includes:

a driving-side rotator that is connected to the first shaft to rotate integrally with the first shaft;

a driven-side rotator that is connected to the second shaft to rotate integrally with the second shaft;

a spring support that includes a cylindrical wall, which is arranged radially outward of the driving-side rotator and the driven-side rotator and is stationary; and a coil spring that is axially placed between the driving-side rotator and the driven-side rotator and includes:

a spring main body that is helically wound and is received inside the cylindrical wall of the spring support in such a manner that the spring main body is resiliently urged against the cylindrical wall when the first shaft and the second shaft are both stopped;

at least one driving-side engaging portion that is connected to the spring main body and projects beyond the spring main body in a first axial direction, wherein the at least one driving-side engaging portion is engageable with the driving-side rotator; and at least one driven-side engaging portion that is connected to the spring main body and project beyond the spring main body in a second axial direction opposite to the first axial direction, wherein the at least one driven-side engaging portion is engageable with the driven-side rotator, wherein:

when the driving-side rotator is rotated through energization of the motor, the driving-side rotator engages and moves one of the at least one driving-side engaging portion of the coil spring to wind the spring main body, so that the spring main body is released from the cylindrical wall to rotate integrally with the driving-side rotator, and thus rotation of the driving-side rotator transmitted to the spring main body is further transmitted to the driven-side rotator through one of the at least one driven-side engaging portion of the coil spring to rotate the driven-side rotator and the second shaft; and when the driven-side rotator is rotated by an external mechanical rotational force generated outside the motor, the driven-side rotator engages and moves one of the at least one driven-side engaging portion of the coil spring to unwind the spring main body, so that the spring main body is further urged against the cylindrical wall of the spring support to restrain further rotation of the driven-side rotator.

11. A motor according to claim 10, wherein:

the spring main body includes first and second ends;

the at least one driving-side engaging portions includes first and second driving-side engaging portions that are provided in the first and second ends, respectively, of the spring main body; and the at least one driven-side engaging portions includes first and second driven-side engaging portions that are provided in the first and second ends, respectively, of the spring main body.

12. A motor according to claim 11, further comprising a worm wheel and an output shaft, wherein:

the output shaft is coaxially connected to the worm wheel to rotate integrally with the worm wheel; and the second shaft is a worm shaft, which has a worm meshed with the worm wheel.

13. A motor according to claim 11, wherein:

an opposed end surface of the driving-side rotator, which is opposed to the coil spring, includes an engaging groove, which receives both the first and second driving-side engaging portions; and an opposed end surface of the driven-side rotator, which is opposed to the coil spring, includes first and second engaging grooves, which receive the first and second driven-side engaging portions, respectively.

14. A motor according to claim 11, wherein:

the driving-side rotator is detachably connected to the first shaft; and the driven-side rotator is integrally formed with the second shaft.

15. A motor according to claim 11, wherein:

the first shaft is drivable in both a first rotational direction and a second rotational direction, which is opposite to the first rotational direction, upon energization of the motor;

when the first shaft is driven to rotate in the first rotational direction, the driving-side rotator engages and moves the first driving-side engaging portion of the coil spring, and the first driven-side engaging portion engages and moves the driven-side rotator; and when the first shaft is driven to rotate in the second rotational direction, the driving-side rotator engages and moves the second driving-side engaging portion of the coil spring, and the second driven-side engaging portion engages and moves the driven-side rotator.

* * * * *